United States Patent [19]

Kumagai et al.

[11] 4,325,191
[45] Apr. 20, 1982

[54] COFFEE ROASTER

[75] Inventors: Ryohei Kumagai, Kodaira; Kazuo Maruta, Tokyo, both of Japan

[73] Assignee: Advance Company Limited, Tokyo, Japan

[21] Appl. No.: 150,648

[22] Filed: May 16, 1980

[51] Int. Cl.³ .............................................. F26B 11/04
[52] U.S. Cl. ............................................ 34/54; 34/63; 34/133; 99/286
[58] Field of Search ................ 99/286, 281, 287, 288, 99/468, 470, 474, 479; 34/44, 48, 54, 53, 133, 63

[56] References Cited
U.S. PATENT DOCUMENTS

| | | | |
|---|---|---|---|
| 1,843,131 | 2/1932 | Howson | 34/63 |
| 1,970,499 | 8/1934 | Dent | 34/48 |
| 2,340,345 | 2/1944 | Richeson | 34/63 |
| 2,700,225 | 1/1955 | Schmid et al. | 34/63 |
| 2,936,528 | 5/1960 | Brandl | 34/63 |
| 3,098,726 | 7/1963 | Stone | 34/54 |
| 3,964,175 | 6/1976 | Sivetz | 34/57 A |

*Primary Examiner*—Larry I. Schwartz
*Attorney, Agent, or Firm*—Browdy and Neimark

[57] ABSTRACT

A coffee roaster in which roasting is automatically terminated by the provision in the roaster of a temperature sensing device which detects the temperature of the coffee beans during the steps of stirring and roasting and produces at a predetermined appropriate temperature a signal which is used to terminate the roasting.

4 Claims, 10 Drawing Figures

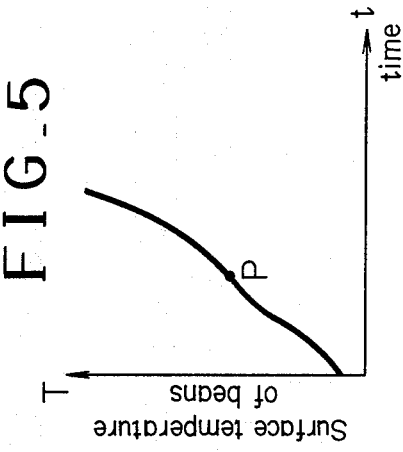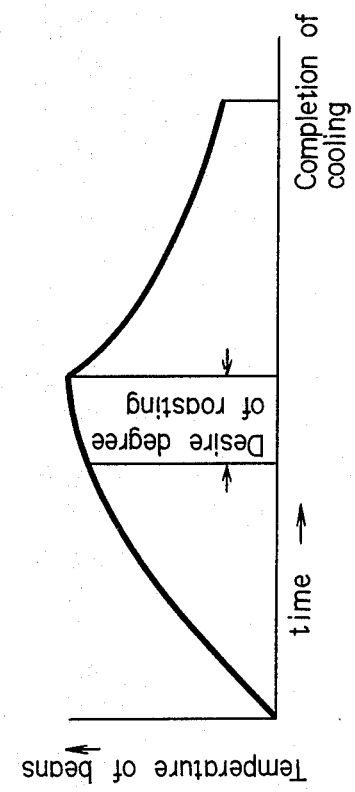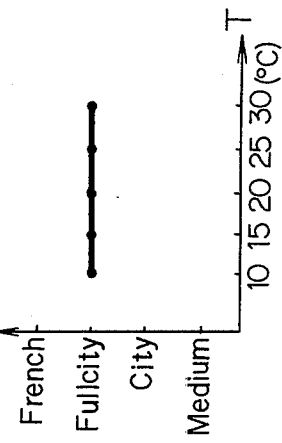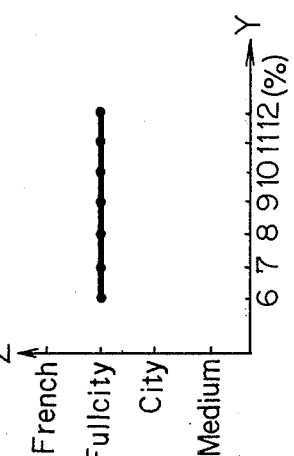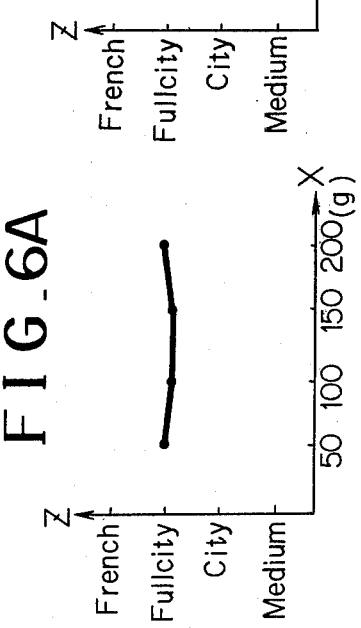

4,325,191

COFFEE ROASTER

BRIEF SUMMARY OF THE INVENTION

The present invention relates to an improved coffee roaster, more particularly to a coffee roaster for automatically sensing the completion of roasting.

In roasting coffee beans, it is quite difficult to judge whether suitable roasting of the coffee beans has been carried out or not. Therefore, the judgement inevitably depends on a visible inspection or perception by skilled persons. Even in such a case, several samplings are required during the course of the roasting, which results in complexity and inconvenience in the system.

Alternatively, there is another roasting method wherein the time control is performed by using a timer. This method creates a difficulty in setting the timer to perform optimum roasting since the amount of coffee beans to be roasted and humidity content contained in the coffee beans vary in each case, thus causing the requirement of changing the time for each roasting thereof.

Furthermore, there is another method wherein the temperature within an exhaust duct is measured. This method cannot directly measure the surface temperature of the coffee beans and tends to fail to carry out desirable roasting due to the fact that there appears a difference between the bean temperature and the exhaust temperature resulting from the occurence of changes in the amount of raw coffee beans, humidity content in the beans and room temperature.

The present inventors concentrated their studies on eliminating these difficulties and found that the degree of roasting closely relates to the surface temperature of coffee beans during the stirring operation in roasting and thereafter, completed the present invention.

The coffee roaster accoding to the present invention is characterized by the provision of a temperature sensing device inserted between layers of coffee beans to be stirred during roasting for measuring the surface temperature of the coffee beans, the temperature sensing device being connected to a thermodetector and connected to a heater through a switching device. As the temperature sensing device, a thermistor is employed and installed at a position facing a roasting drum provided at a front door of a vessel. Upon detecting a predetermined temperature by the temperature sensing device, the thermodetector transmits a detecting signal to the switching device to automatically disconnect the power supply to a heater, thereby making automatic completion of roasting possible.

It is therefore the primary object of the present invention to provide a coffee roaster capable of being easily operated by any person and of assuring and obtaining a desirable degree of roasting.

It is another object of the present invention to provide a coffee roaster for automatically completing roasting by automatically cutting off the thermal source when detection of the surface temperature of coffee beans, by using a temperature sensing device inserted between layers of the coffee beans during the stirring and roasting operation, has reached a predetermined temperature.

The foregoing objects and other objects as well as the characteristic features of the invention will become more apparent and more readily understandable by the following description and the appended claims when read in conjunction with the accompanying drawings.

BRIEF DESCRIPTION OF DRAWINGS:

FIG. 4 is a graph showing the change of coffee bean temperature with respect to the roasting degree thereof;

FIG. 5 is a graph showing a relationship between the surface temperature of coffee beans and time; and FIGS. 6(A), 6(B), and 6(C) are graphs showing the change in the degree of roasting relative to the change in the amount of raw beans, amount of moisture content and room temperature, respectively.

DETAILED DESCRIPTION

Figure 1:
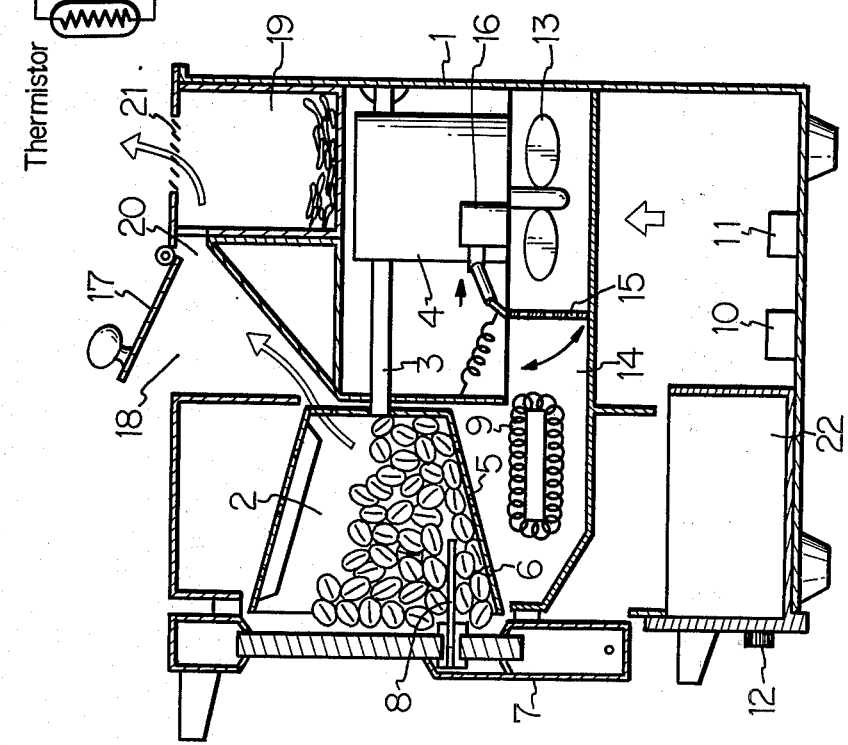
FIG. 1 is a longitudinal sectional view of a coffee roaster according to a preferred embodiment of the present invention.

Referring to the drawings, an embodiment according to the present invention will be explained. In FIG. 1, there is shown a coffee roaster 1 as a preferred embodiment of the present invention, wherein a drum 2 is mounted so as to be rotatably driven through a drum axis shaft 3 by a motor 4. The drum 2 is formed into a cylindrical shape or tapered shape as illustrated and is provided at the side 5 thereof with a plurality of ventilation holes 6 having a dimension such that the coffee beans cannot fall down therethrough. The coffee beans are stirred by the rotation of the drum 2. Provided at the front door 7 of the coffee roaster 1 is a temperature sensing device 8 which faces the interior of the drum 2. The temperature sensing device 8 is inserted between the coffee beans within the drum 2 to directly detect the surface temperature of the coffee beans. Preferably, the device 8 is installed by pressing and fixing same using a thermal resistant rubber containing silicon atoms in its molecular structure.

Figure 2:
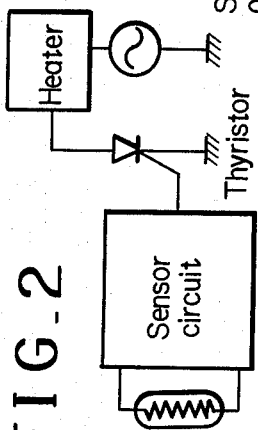
FIG. 2 is a circuit diagram exemplifying a circuit for disconnecting a thermal source.

The temperature sensing device 8 is not limited to a thermo-electric convertor device such as a thermistor, a bimetal device and the like. A thermo-optic convertor device and any devices capable of generating an output signal responsive to the change in temperature such as thermometer or the like can be utilized as the temperature sensing device 8. A heater 9 used as a heating source for roasting is usually mounted at a lower portion of the roaster below the drum 2. The utilization of the temperature sensing device 8 permits automatic completion of roasting. Further, cooling may be started at the time the roasting is finished, and then terminated. A construction therefor will be illustrated with reference to the drawing. The temperature sensing device 8 is connected to a thermodetector 10 connected with a switching device 11 of the heater 9 and therefore, the detecting signal from the thermodetector 10 is transmitted to the switching device 11. When the detecting signal is transmitted to the switching device 11, the supply of power to the heater 9 is automatically disconnected to complete the roasting. The operating point setting volume 12 of the thermodetector 10 is set so as to disconnect the power supply to the heater 9 by causing the thermodetector 10 to operate when the surface temperature of the coffee beans reaches a temperature range in which a desired degree of roasting can be obtained. By way of example, a circuit for disconnecting the heat supply is shown in FIG. 2. A fan 13 for supplying cool air is mounted within an air supplying duct 14 in which the heater 9 and the fan 13 are separated by an air flow rate adjusting plate 15 from each other. The adjusting plate 15 is driven by an air flow rate adjustor 16 connected with the switching device 11 so as to open and close the duct 14. Although the adjusting plate 15 is closed during the operation of roasting, a small volume of air is supplied to the drum 2 through the small holes provided in the plate. The fan 13 is driven by the motor 4 which drives the drum 2. Other features of the construction are explained hereinbelow.

The head portion of the coffee roaster 1 is opened at an inlet portion 18 covered by a hood 17 which is integral with a recovery vessel 19. The recovery vessel 19, having an exhaust hole 21 at the head portion thereof, receives thin husks separated from the coffee beans within the drum 2 and are blown away through the exhaust duct 20, and this recovery vessel 19 is disconnectably mounted on the coffee roaster 1. Provided at the bottom portion of the coffee roaster 1 is a drawing-type housing vessel 22 for receiving the coffee beans supplied from the drum 2.

Figure 3A:
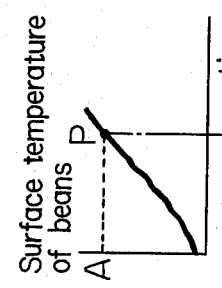
FIGS. 3(A), 3(B), and 3(C) are graphs showing the surface temperature of coffee beans, the resistance of a thermistor and the output signal from a sensor circuit relative to time lapse, respectively, and an interrelationship therebetween.
Figure 3B:
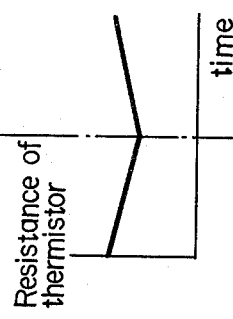
Figure 3C:
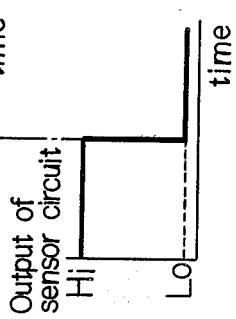

With reference to the above-mentioned constructions which automatically perform the completion of roasting and the start and completion of cooling, an example of the operation of each constructional element will now be illustrated. The hood 17 is opened and the coffee beans are charged into the drum 2 from the inlet portion 18 and then the volume 12 is preset. It has been known that the temperature of beans during stirring and roasting thereof increases as the degree of roasting increases, as shown in FIG. 4. The volume 12 is set so that the thermodetector 10 operates to cause the power supply connected to the heater 9 to be disconnected when the temperature reaches the range corresponding to a desirable degree of roasting. Thereafter, a power source switch is closed to rotate the motor 4, resulting in starting of the rotation of the drum 2 through the shaft axis 3 to carry out the stirring operation. At the same time, the switch of the heater 9 is actuated and the fan 13 may be rotated. The air flow rate adjusting plate 15 remains closed. Thus, the amount of supplied air is restricted and a small volume of air is supplied to the heater 9 and then the roasting operation start. Thereafter, upon detecting the temperature, which exceeds the preset temperature, by the temperature sensing device 8 inserted between the coffee beans, the detecting signal is transmitted from the thermodetector 10 to the switching device 11 to automatically disconnect the power supply to the heater 9 and to terminate roasting. Referring to FIG. 2, the above-mentioned operation is explained in detail below. When the power source is actuated, the sensor circuit is preset in an initial state to emit a high level signal to the gate of a thyristor as illustrated in FIG. 3C. The application of the high level signal causes the thyristor to activate and the heater 9 to be energized and then roasting begins. After starting the roasting, the surface temperature of the coffee beans increases, as shown in FIG. 3A, while the resistance value of the thermistor decreases, as indicated in FIG. 3B, and the sensor circuit emits a low level signal output at a predetermined temperature P as shown in FIG. 3C. The thyristor receives the signal to close the gate thereof, causing the heater 9 to be deactivated and the roasting operation to be completed. At that time, the air flow rate adjustor 16 connected to the switching device 11 simultaneously operates to open the air flow rate adjusting plate 15 so as to increase the amount of the supplied air, thereby rapidly cooling the roasted coffee beans. The temperature sensing device 8 detects the drop in surface temperature of the coffee beans to the predetermined cooling temperature, causing the air flow rate adjustor 16 to be actuated through the thermodetector 10 and the switching device 11, to close the adjusting plate 15 and the cooling operation is terminated.

Alternatively, the air flow cooling mechanism may be constructed by using a timer so that it operates during a predetermined time period, which is preset in a timer mechanism, starting from the time that a roasting completion detector emits an output command signal so as to control the starting and termination of the cooling operation. When the front door 7 of the roaster is half opened after the completion of cooling, the roasted beans fall into the housing vessel 22. Of course, the completion of roasting may be automated while the cooling of the coffee beans may be carried out outside the coffee roaster.

The coffee beans were roasted in accordance with the embodiment of the present invention constructed as mentioned above and the results are as follows:

The surface temperature of the beans

The surface temperature of the beans in a roasting operation, wherein the heating is carried out by supplying a constant power to the heater 9, changes as shown in the graph in FIG. 5 in which the abscissa indicates time and the ordinate indicates the surface temperature of the beans and P indicates the point at which the water content of the beans vaporizes and the temperature rapidly rises. Experiments confirmed the fact that the surface temperature of the beans and the degree of roasting after the completion of heating, in accordance with the roasting performed in the above-mentioned manner, does not depend on conditions such as the amount of raw beans, humidity content, and room temperature and produces a highly correlated relationship. Therefore, there is shown the change in the degree of the roasting with respect to the changes in the amount of raw beans, humidity content and room temperature, where the surface temperature of the beans at the termination of heating is maintained constant.

The degree of roasting

FIGS. 6A, B and C indicate the changes in the degree of roasting with respect to the changes in the amount of raw beans, humidity content and room temperature, respectively.

As shown in FIG. 6A, experiments wherein the roasting was carried out by predetermining the degree of roasting confirm that the degree of roasting becomes relatively weaker than fullcity where the amount of raw beans varies from 100 grams to 150 grams. However, the degree of roasting in such instance does not substantially change relative to the raw bean amount whether it be 50 grams or 200 grams.

FIG. 6B shows the results of experiments regarding the degree of roasting using 200 grams of raw beans in which water content varies from 6% to 12%. This confirms that the degree of roasting remains constant regardless of the change in the water content of the raw beans.

FIG. 6C shows the results of experiments regarding the degree of roasting using 200 grams of raw beans in the case where the room temperature varies from 10° C. to 30° C. This result confirms that the degree of roasting also remains constant even when the room temperature changes.

Furthermore, other experiments different from the above-mentioned experiments where non-constant heating was carried out confirm that the relationship between the surface temperature of the beans at the completion of heating and the degree of roasting is not affected by changes in the amount of raw beans, water content, room temperature and the like. Thus, the same degree of roasting can always be reproduced regardless of changes in the above conditions.

As explained above, it is merely required in the present invention to turn the switch to the ON position after charging raw coffee beans into the coffee roaster and setting the volume at a desired degree of roasting. The judgement of the completion of roasting is automatically carried out without the necessity of skill operator since the roasting temperature of the coffee beans, charged into the rotation drum, is automatically detected by the temperature sensing device. This always permits the obtainment of the desired degree of roasting and a remarkable reduction in cost in the case where large amounts of beans are to be roasted. Furthermore, the operation of cooling can be automatically performed.

We claim:

1. An automatic coffee roaster having a compact structure, comprising a rotatable drum provided at a side thereof with a plurality of ventilation holes, an air supplying duct arranged at a lower portion of said roaster below said drum and provided therein with a heater, for heating the air to roast coffee beans, and a fan, which heater and fan are separated from each other by an air flow rate adjusting plate, an exhaust duct arranged at an upper portion of the roaster above said drum and provided therein with a hood for covering an inlet portion of the duct, a recovery vessel for receiving thin husks which become separated from the coffee beans, a roasting control mechanism including a switching device which disconnects said heater on receipt of a detection signal from a temperature sensing device which is mounted on an inner surface of said drum so as to detect the surface temperature of coffee beans therein, and an air supply control mechanism, including an air flow adjustor device, connected to said switching device which operates to open the adjusting plate so as to increase air flow to the drum for rapidly cooling the roasted coffee beans at the same time as said heater is disconnected, the air flow adjustor device normally operating to close said adjusting plate so as to supply a small volume of air flow to said drum through the small perforation holes located in the adjusting plate, which air is heated during the roasting operation, whereby coffee beans are homogeneously roasted and thereafter rapidly cooled in said roaster through automatic consecutive operations while effecting efficient recovery of the thin husks which become separated from the coffee beans during roasting.

2. A coffee roaster as set forth in claim 1, wherein the temperature sensing device is either a thermo-electric convertor or a thermo-optic convertor.

3. A coffee roaster as set forth in claim 1, further including a front door having a half-opening mechanism in order to continuously cause the roasted coffee beans to fall into a housing vessel located at the lower portion of the roaster.

4. A coffee roaster as set forth in claim 1, wherein the recovery vessel is detachably mounted on the roaster.

* * * * *